United States Patent
Lord et al.

(10) Patent No.: US 12,114,237 B2
(45) Date of Patent: Oct. 8, 2024

(54) SPORTS BAG

(71) Applicant: Viztek Sports Media Limited, Herne Bay Kent (GB)

(72) Inventors: Peter Lord, Herne Bay Kent (GB); Jonathan Bowden, Herne Bay Kent (GB)

(73) Assignee: VIZTEK SPORTS MEDIA LIMITED, Kent (GB)

( * ) Notice: Subject to any disclaimer, the term of this patent is extended or adjusted under 35 U.S.C. 154(b) by 296 days.

(21) Appl. No.: 17/438,501

(22) PCT Filed: Mar. 12, 2020

(86) PCT No.: PCT/EP2020/056735
§ 371 (c)(1),
(2) Date: Sep. 13, 2021

(87) PCT Pub. No.: WO2020/182967
PCT Pub. Date: Sep. 17, 2020

(65) Prior Publication Data
US 2022/0150673 A1  May 12, 2022

(30) Foreign Application Priority Data

Mar. 13, 2019 (GB) .................................... 1903454

(51) Int. Cl.
*H04W 4/02* (2018.01)
*G06Q 30/0241* (2023.01)
*G09G 3/00* (2006.01)
*H04W 4/029* (2018.01)
*H04W 4/23* (2018.01)

(52) U.S. Cl.
CPC .......... *H04W 4/23* (2018.02); *G06Q 30/0241* (2013.01); *G09G 3/035* (2020.08); *H04W 4/029* (2018.02); *G09G 2370/022* (2013.01); *G09G 2370/16* (2013.01)

(58) Field of Classification Search
CPC .................................. H04W 4/23; H04W 4/02
See application file for complete search history.

(56) References Cited

U.S. PATENT DOCUMENTS

| 2006/0059745 | A1 | 3/2006 | Maqui et al. | |
| 2010/0299977 | A1* | 12/2010 | Kirkpatrick | G09F 9/35 348/E5.022 |
| 2014/0339110 | A1* | 11/2014 | Soracco | G01S 19/19 473/409 |

FOREIGN PATENT DOCUMENTS

| CN | 205611972 | 10/2016 |
| GB | 2517712 | 3/2015 |

OTHER PUBLICATIONS

International Search Report and Written Opinion dated Jun. 8, 2020 in International Patent Application No. PCT/EP2020/056735.

* cited by examiner

*Primary Examiner* — Michael T Vu
(74) *Attorney, Agent, or Firm* — Billion & Armitage

(57) ABSTRACT

A sports bag including an electronic display screen carried on an outwardly facing surface of the bag, a power source located within the bag, and a controller which controls the images displayed on the screen.

15 Claims, 2 Drawing Sheets

SPORTS BAG

FIELD OF THE INVENTION

The subject invention relates to sports bags, such as golf bags, which include an electronic display screen upon which different indicia, such as sponsors or messages, may be displayed.

BACKGROUND OF THE INVENTION

Participants in a large number of sports use bags to carry their kit. In many sports, these bags are left in a changing room or locker room during the game and are rarely seen. However, in certain sports, such as golf and tennis, for example, the bags are typically on display during the match/event.

Sports people are often sponsored and sponsors are often willing to pay relatively large sums for their brand(s) to appear in connection with the people they are sponsoring.

It is known for sponsors' brands to be placed on items of kit. However, these are usually permanently affixed to the item of kit.

WO2004/012825 describes a golf bag which includes interchangeable display panels. Such panels are detachably secured to the bag, for example via a zip fastening, hook and loop fastenings, insertion into a pocket and snap-on panels. However, it is necessary for a user to change manually the display panels. This requires the user to remember to change the panel and to manually detach the first panel and replace it with a second panel. It also requires all of the different panels to be carried by the user.

SUMMARY OF THE INVENTION

According to a first aspect of the invention, there is provided a sports bag including an electronic display screen carried on or by an outwardly facing surface of the bag, an electrical power source connected to the display screen, and a controller which controls the images displayed on the screen.

The provision of an electronic display screen makes changing the image displayed on screen much easier. It may also be automated so that the user need not remember to make the changes manually. Furthermore, the different images may be stored by the controller or sent to the controller, which avoids the need to carry each of the different displays with the bag.

In an embodiment of the invention, the electrical power source is located within the bag and is separate from, but electrically connected to the display screen. In an alternative embodiment, the electrical power source may form part of the display screen. For example, the display screen may include an electrical power source. The electrical power source (regardless of its location) may be rechargeable. For example, the power source may comprise one or more rechargeable batteries.

As such, the sports bag may include a recharging port. Such a recharging port may receive a lead or plug which is connected to a remote electrical energy source which is used to recharge the electrical power source.

In such embodiments, the bag may include an electrical power generator, such as one or more photovoltaic cells, which are electrically connected to the power source. Such electrical generators may extend the time after which the power source needs to be recharged.

In embodiments in which the electrical power source is separate from the display screen and is rechargeable, the electrical power source is suitably removeable from the sports bag. This makes it easier to re-charge the power source without requiring the bulky bag to be in the same location. It also permits a drained or partially drained power source to be swapped for a fully charged power source. In such embodiments, the sports bag suitable includes or defines a housing or a compartment for the power source. The housing suitably includes a latching element which retains the power source in place in use, but which permits the power source to be removed from the bag for recharging. The housing suitably also separates the power source from the contents of the bag such that one does not cause damage to the other. In a further example of the invention the electrical power source may be located in detachable legs of the sports bag.

An additional benefit of having a removable power source, which is separate from the sports bag and the screen, is when the bag is transported. Sports bags are often transported on aircraft, typically in the hold. However, certain airlines have restrictions on the transportation of rechargeable power sources. With detachable or removeable power sources, the sports bag may be safely transported, while the battery may be transported separately in accordance with any associated safety protocols for transporting power sources.

As noted above, multiple different images to be displayed on the display screen may be stored in the controller. Accordingly, the controller may include a memory storage component and a processor, wherein the memory storage component stores images to be displayed on the display screen and the processor accesses the images from the memory storage component. The images may be accessed according to a pre-determined protocol or algorithm.

For example, the controller may further include a clock and the processor changes the image displayed on the screen at a pre-determined time or after a pre-determined interval. Thus, if there are six different images to be displayed on the display screen a first image may be displayed for a period of time, after which a second image is displayed and so-on until each of the images have been displayed. This display routine may then be cycled for as long as the user desires. Alternatively, certain images may be displayed for a longer period of time than other images. For example, if sponsor A has paid more money to the player than sponsor B, then the image(s) relating to sponsor A may be displayed for a longer period of time than the image(s) relating to sponsor B.

Additionally or alternatively, the controller may further include a wireless signal receiver which receives wireless signals from a remote base station. In this case, the remote base station may control the images that are displayed on the display screen. The wireless signals may comprise data relating to images to be displayed on the screen. The controller may control the display screen to display images encoded by the wireless signals received by the receiver. In this way, the display screen may display images relating to personal sponsors of the player in addition to images relating to sponsors of the event as a whole. Such images may be displayed simultaneously or sequentially. Additionally or alternatively, the display screen may display images or information relating to instantaneous information relating to the player, such as betting odds or the item of sports equipment currently being used (e.g. golf club).

In an embodiment of the invention, the controller further includes a GPS location sensor which senses the location of the bag. The images displayed by the display screen may be determined by the geographic location of the bag. In such embodiments, the controller may further include a wireless signal transmitter which transmits to a remote base station the location of the bag. The remote base station may further include a wireless signal receiver which receives the signals transmitted by the bag transmitter. In this way, the remote base station may also receive information relating to the geographic position of the sports bag.

The remote base station may include a server which is programmed to transmit data relating to images to be displayed on the display screen based on the geographic location of the sports bag and/or based on time, for example, an elapsed time since the display screen on the bag was activated or a specific time of day.

The controller may be separate from but connected to the display screen. Alternatively, the display screen may include the controller.

In an embodiment of the invention, the power source and the controller are both separate from the display screen. In such embodiments, the power source and the controller are detachably connectable to the display screen.

The display screen may be any type of known electronic display screen. For example, it may be selected from a liquid crystal display (LCD) and a light emitting diode display (LED). Such screens may be flexible. Accordingly, the display screen for use with the sports bag may be flexible. In the context of the present invention, the term "flexible" means that the display screen is able to flex by a determined amount without damage to the screen.

The display screen may be secured to an outwardly facing surface of a panel which forms an external part of the sports bag. Thus, the display screen may be adhered, stitched, riveted or otherwise fixed to an externally facing surface of the sports bag. As the power source and, optionally, the controller are typically located within the sports bag, the sports bag may include a body which defines the external panel(s) of the bag and the body may define one or more apertures through which electrical wires are located in order to electrically connect the display screen to the power source and optionally the controller.

In alternative embodiments, the controller may form a part of the display screen. Additionally or alternatively, the power source may be carried by the display screen. Thus, the display screen, controller and the power source may all be carried externally by the sports bag or one or more of the controller and power source may be carried internally within the sports bag.

As an alternative to externally mounting the display screen to the body of the sports bag, the bag may comprise an external panel which defines at least a part of the external surface of the bag, wherein the external panel defines an aperture therein and the display screen is located within the aperture. In such embodiments, the display screen forms part of the external panel. A peripheral edge portion of the display screen may be fixed to a corresponding peripheral edge portion of the panel which defines the aperture, for example via an adhesive, ultrasonic welding, stitching, riveting, or any other known type of fixing.

According to a further alternative embodiment, the display screen is detachable from the sports bag. The display screen may be relatively expensive and fragile. Accordingly, transportation of the sports bag with a screen attached thereto may result in damage to the screen. For example, if the sports bag is transported in the hold of an aircraft, it may experience a certain amount of rough handling, which may in turn result in damage to the screen. However, if the screen is detachable from the bag, it may be transported in a protective case or housing to prevent minimise the risk of damage to the screen.

In embodiments in which the display screen is detachable/removeable from the sports bag, the sports bag suitably includes a display screen retaining apparatus which releasably secures the display screen to the sports bag. The display screen retaining apparatus may be in the form of a housing or retaining elements which retain all of the display screen or portions thereof. Optionally, the display screen retaining apparatus is carried externally on the sports bag. The display screen retaining apparatus suitably includes an aperture or a transparent window. The transparent window may protect the display screen in use, for example against environmental conditions (e.g. precipitation, dust, sand, etc.), while allowing information and/or indicia displayed on the screen to be viewed in use. The display screen retaining apparatus may further include an opening which may be reversibly opened and closed. Thus, when the opening is in an open configuration, the display screen may be removed from the sports bag, whereas when the opening is in a closed configuration, the display screen is retained by the display screen retaining apparatus. The opening is suitably closed by a reversible closing element, such as a zip or a hook and eye fastening arrangement for example. Optionally, the reversible closing element provides a weathertight seal or barrier when the opening is in a closed configuration.

In an embodiment of the invention, the display screen retaining apparatus may be in the form of a pocket carried externally by the sports bag.

The sports bag may be a golf bag or a tennis bag, for example.

According to a second aspect of the invention, there is provided an advertising system comprising one or more sports bags as defined anywhere herein and a remote base station, wherein the or each sports bag controller includes a wireless signal receiver, the remote base station includes a wireless signal transmitter, the wireless signal receiver receives wireless signals transmitted by the wireless signal transmitter, and the images displayed on the display screen are controlled by the wireless signals received by the wireless signal receiver.

It will be appreciated that the remote base station controls the images displayed on the display screen via the wireless signals. The wireless signals may instruct the controller to select a specific image or series of images that are stored on a memory storage medium carried by the bag or the wireless signals may include data relating to the images to be displayed. In other words, data encoding the images to be displayed may be sent to the controller (e.g. in digital form) over the wireless network.

The remote base station may transmit instructions to more than one sports bag so that each sports bag may display the same or different images.

In an embodiment of the invention, the sports bag controller further includes a GPS location sensor and a wireless signal transmitter, the remote base station includes a wireless signal receiver, the sports bag transmits data relating its location via the wireless signal transmitter, the remote base station receives the data relating to the location of the sports bag via its wireless signal receiver, and the base station transmits the wireless signals to the sports bag according to its location.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
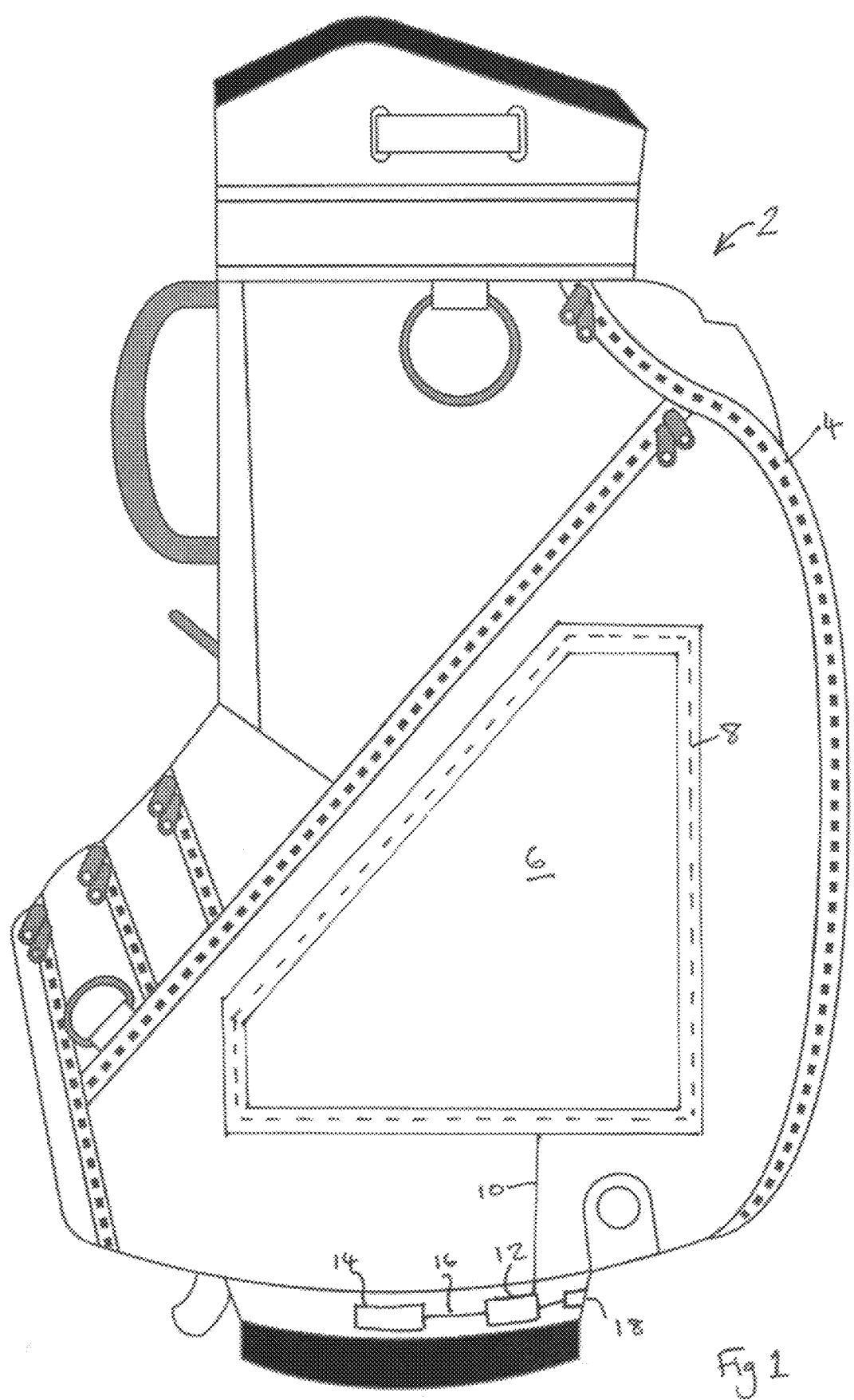
FIG. 1 is a side view of a golf bag according to an embodiment of the first aspect of the invention.

FIG. 1 shows a golf bag 2 which comprises a conventional golf bag body 4 and a flexible colour LCD display screen 6. The LCD display screen 6 includes around its periphery a polymeric skirt 8 which is stitched to the outer surface of the golf bag body in a conventional manner.

The display screen 6 is connected via an electrical cable 10 to a controller 12, which in turn is electrically connected to a rechargeable battery power source 14 via a second cable 16. The controller 12 is also electrically connected to a charging port 18 secured to a base portion of the golf bag body 4.

The controller 12 includes power conditioning components which condition the electrical energy received via the recharging port 18 and transmit this energy to the rechargeable battery power source 14.

In an alternative embodiment, the rechargeable battery power source 14 is removeable from the golf bag 2 for recharging outside of the bag 2. In such embodiments, the rechargeable battery power source 14 is located within a padded compartment within the golf bag 2 such that the battery 14 is not damaged by any of the golf clubs within the bag 2 and the battery 14 does not damage any of the clubs.

Figure 2:
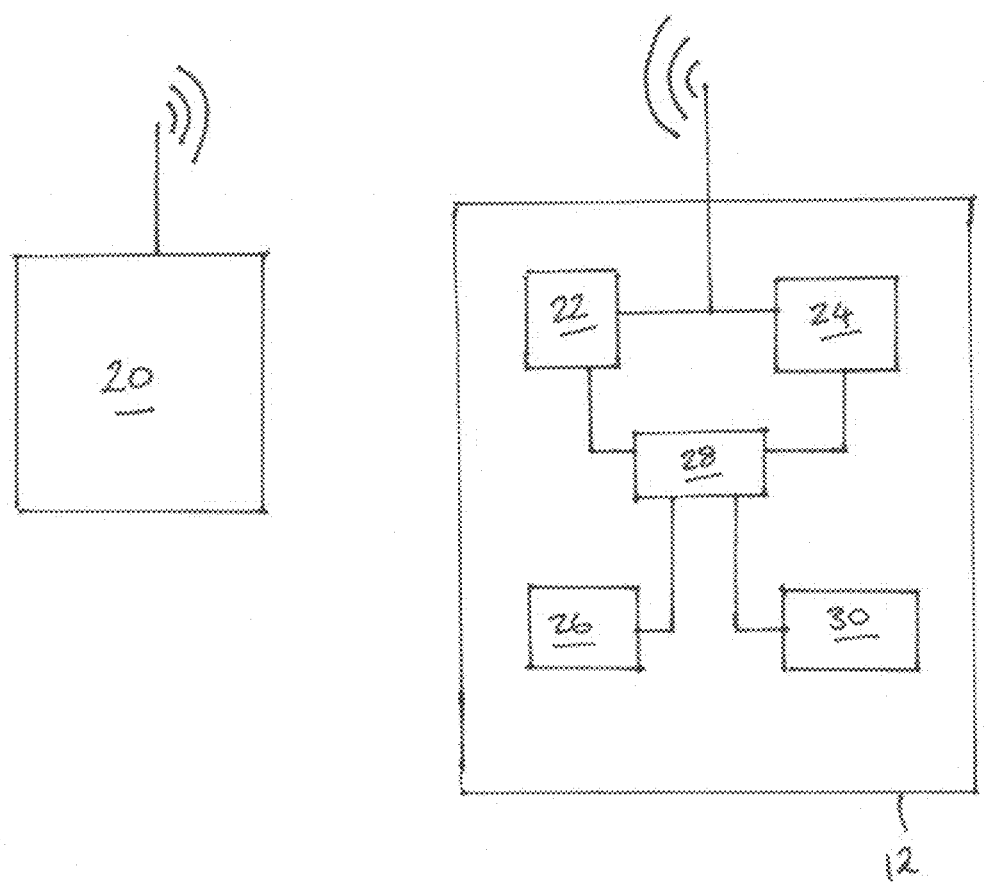
FIG. 2 is a schematic representation of a base station and the controller according to an embodiment of the second aspect of the invention.

The controller 12 further includes a wireless signal receiver 22, a wireless signal transmitter 24, a memory storage component 26, a processor 28 and a GPS position sensor 30 (all of which are shown schematically in FIG. 2), all of which are conventional components.

The controller 12 is wirelessly connected to a remote base station (20) via a wireless network. The GPS position sensor 30 senses the geographic location of the golf bag and transmits this data to the remote base station 20 via the wireless signal transmitter 24. The remote base station 20 receives the positional data and determines the image that should be displayed on the display screen 6 at that location accordingly to pre-determined algorithm. The remote base station 20 then transmits signals to the controller 12 relating to required image. The wireless signal receiver 22 of the controller 12 receives the transmitted signal and the processor 28 selects the required image from the images stored in the memory storage component 26 and displays that image on the display screen 6.

This process is repeated each time the position of the golf bag changes.

In accordance with the invention, multiple different images may be displayed separately on the display screen as the golf bag 2 is moved around a golf course.

In a further embodiment, the remote base station 20 transmits signals which encode the images to be displayed on the display screen 6. In this way, data encoding the images to be displayed is sent directly to the controller 12 from the remote base station 20.

The remote base station 20 may control a plurality of golf bags 2 such that they all display the same images at any given time, or the remote base station 20 may control each golf bag 2 individually, such that the images displayed on the display screen 6 of each golf bag 2 are different or unique to that bag.

It will be appreciated that while the display screen 6 is shown having a specific configuration in FIG. 1, it could instead have any suitable configuration.

Similarly, while the processor 12 and the rechargeable power source 14 are shown as separate components, one or both of these could form a part of the display screen 6.

Furthermore, in the embodiment described above, the rechargeable power source 14 is charged via the port 18. However, the skilled person will appreciate that a wireless (induction) charging system could be used to recharge the power source 14.

The invention claimed is:

1. A sports bag including an electronic display screen carried on an outwardly facing surface of the bag, a power source electrically connected to the display screen, and a controller which controls the images displayed on the screen, wherein the display screen includes the controller, and wherein the controller includes a memory storage component and a processor, wherein the memory storage component stores images to be displayed on the display screen and the processor accesses the images from the memory storage component.

2. The sports bag according to claim 1, wherein the power source is rechargeable, is removable from the sports bag, and the sports bag includes a housing which releasably retains the rechargeable power source within the bag.

3. The sports bag according to claim 1, wherein the controller includes a clock and the processor changes the image displayed on the screen at a pre-determined time or after a pre-determined interval.

4. The sports bag according to claim 1, wherein the controller further includes a receiver which receives wireless signals from a remote base station.

5. The sports bag according to claim 1, wherein the controller further includes a GPS location sensor which senses the location of the bag.

6. The sports bag according to claim 5, wherein the controller further includes a transmitter which transmits to a remote base station the location of the bag.

7. The sports bag according to claim 1, wherein the display screen is selected from a liquid crystal display (LCD) and a light emitting diode display (LED).

8. The sports bag according to claim 1, wherein the display screen is flexible.

9. The sports bag according to claim 1, wherein the display screen is secured to an externally facing surface of the bag.

10. The sports bag according to claim 1, wherein the bag comprises a panel, the panel defines an aperture therein, and the display screen is located within the aperture such that the display screen forms part of the panel.

11. The sports bag according to claim 1, wherein the display screen is detachable from the bag; and the sports bag includes a display screen retaining apparatus configured to receive the display screen.

12. The sports bag according to claim 11, wherein the display screen retaining apparatus includes a transparent window.

13. The sports bag according to claim 11, wherein the display screen retaining apparatus includes a closable opening.

14. An advertising system comprising a sports bag according to claim 1 and a remote base station, wherein the sports bag controller includes a wireless signal receiver, the remote base station includes a wireless transmitter, the wireless signal receiver receives wireless signals transmitted by the wireless transmitter, and the images displayed on the display screen are controlled by the wireless signals received by the wireless signal receiver.

15. The advertising system according to claim 14, wherein the sports bag controller further includes a GPS location sensor and a transmitter, the remote base station includes a receiver, the sports bag transmits data relating its location via the transmitter, the remote base station receives the data relating to the location of the sports bag via its receiver, and the base station transmits the wireless signals to the sports bag according to its position.

* * * * *